(12) United States Patent
Camras et al.

(10) Patent No.: US 11,007,931 B2
(45) Date of Patent: May 18, 2021

(54) VEHICLE INTERIOR LIGHTING AND ILLUMINATION

(71) Applicant: Lumileds LLC, San Jose, CA (US)

(72) Inventors: Michael Camras, San Jose, CA (US); Jyoti Kiron Bhardwaj, Cupertino, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/727,702

(22) Filed: Dec. 26, 2019

(65) Prior Publication Data

US 2020/0207264 A1     Jul. 2, 2020

Related U.S. Application Data

(60) Provisional application No. 62/785,124, filed on Dec. 26, 2018.

(51) Int. Cl.
| | | |
|---|---|---|
| *B60Q 3/76* | (2017.01) | |
| *B60Q 3/20* | (2017.01) | |
| *B60Q 3/85* | (2017.01) | |
| *B60Q 3/62* | (2017.01) | |
| *F21K 9/65* | (2016.01) | |
| *H05B 45/24* | (2020.01) | |
| *H05B 47/11* | (2020.01) | |
| *H05B 47/13* | (2020.01) | |
| *H05B 47/19* | (2020.01) | |
| *H05B 45/14* | (2020.01) | |

(52) U.S. Cl.
CPC ............. *B60Q 3/76* (2017.02); *B60Q 3/20* (2017.02); *B60Q 3/62* (2017.02); *B60Q 3/85* (2017.02); *F21K 9/65* (2016.08); *H05B 45/14* (2020.01); *H05B 45/24* (2020.01); *H05B 47/11* (2020.01); *H05B 47/13* (2020.01); *H05B 47/19* (2020.01); *B60Q 2900/30* (2013.01)

(58) Field of Classification Search
None
See application file for complete search history.

(56) References Cited

U.S. PATENT DOCUMENTS

| | | |
|---|---|---|
| 6,419,379 B1 | 7/2002 | Hulse |
| 7,534,017 B2 | 5/2009 | Barowski et al. |
| 8,876,343 B2 | 11/2014 | Murray et al. |
| 9,254,785 B2 | 2/2016 | Sohizad et al. |
| 9,731,649 B2 | 8/2017 | Gocke |
| 2006/0044800 A1* | 3/2006 | Reime .............. H05B 45/14 362/276 |
| 2009/0251917 A1 | 10/2009 | Wollner et al. |
| 2013/0234593 A1* | 9/2013 | Nordstrom ......... B60Q 1/2603 315/80 |
| 2015/0092434 A1 | 4/2015 | Satake et al. |
| 2017/0225613 A1 | 8/2017 | Ohashi |
| 2017/0242182 A1 | 8/2017 | Diana et al. |

(Continued)

FOREIGN PATENT DOCUMENTS

| | | |
|---|---|---|
| DE | 102010003270 A1 | 9/2011 |
| DE | 102013016346 A1 | 4/2014 |

(Continued)

*Primary Examiner* — Dedei K Hammond

(57) ABSTRACT

One or more light sources, one or more detectors, a processor, and a controller are configured to provide spot illumination that follows a moving object, a moving occupant, or a portion of a moving occupant in the vehicle.

20 Claims, 6 Drawing Sheets

(56) References Cited

U.S. PATENT DOCUMENTS

| | | |
|---|---|---|
| 2018/0074255 A1 | 3/2018 | Den Breejen et al. |
| 2018/0074256 A1 | 3/2018 | Den Breejen et al. |
| 2018/0164495 A1 | 6/2018 | Den Breejen et al. |
| 2018/0186285 A1* | 7/2018 | Heinrich .................. G01J 1/00 |
| 2019/0275935 A1* | 9/2019 | Lisseman ................ B60Q 3/80 |

FOREIGN PATENT DOCUMENTS

| | | |
|---|---|---|
| DE | 102013203823 A1 | 9/2014 |
| EP | 1522459 B1 | 1/2013 |
| EP | 2550181 A1 | 1/2013 |
| EP | 2688769 A1 | 1/2014 |
| GB | 2553337 A | 3/2018 |
| KR | 10-2017-0099796 A | 9/2017 |

* cited by examiner

VEHICLE INTERIOR LIGHTING AND ILLUMINATION

CROSS REFERENCE TO RELATED APPLICATIONS

This application claims benefit of priority to U.S. Provisional Patent Application No. 62/785,124 filed Dec. 26, 2018, which is incorporated herein by reference in its entirety.

FIELD OF THE INVENTION

The present invention relates to lighting, in particular to interior vehicle lighting.

BACKGROUND OF THE INVENTION

Interior lighting in a vehicle may be used to illuminate an occupant, illuminate an area, such as the lap of an occupant who may be looking at a book, map, or electronic device and/or to illuminate a surface or object of the interior of the vehicle such as a seat or floor of the vehicle, a door handle, lock, window crank, or switch for locks or windows, outline of gauges, entertainment devices, seating area, foot area, or arm rest areas.

SUMMARY OF THE INVENTION

This specification discloses systems, devices, and methods in which one or more light sources, one or more detectors, a processor, and a controller are configured to provide spot illumination that follows a moving object, a moving occupant, or a portion of a moving occupant in the vehicle.

The light sources may be or comprise LEDs, for example arrays of microLEDs.

These and other embodiments, features and advantages of the present invention will become more apparent to those skilled in the art when taken with reference to the following more detailed description of the invention in conjunction with the accompanying drawings that are first briefly described.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention.

Figure 1:
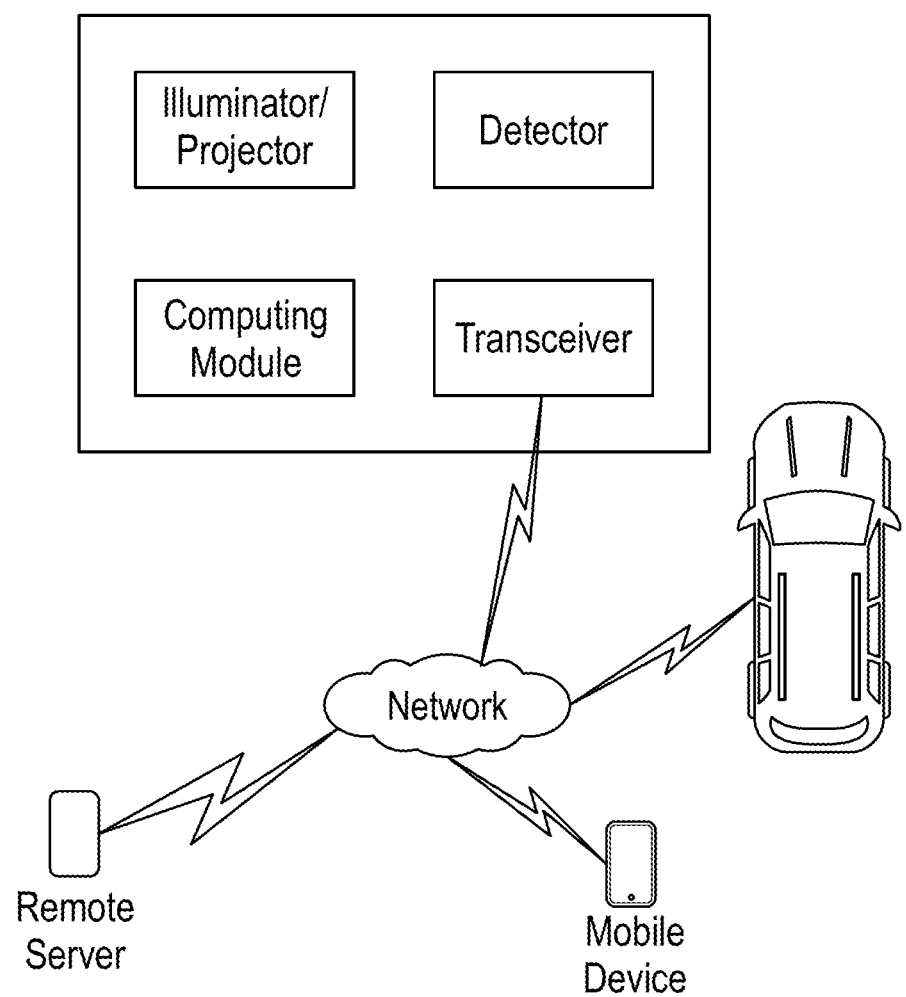
FIG. 1 is a block diagram of an example embodiment of a vehicle interior light system as disclosed herein.

Referring to FIG. 1, a vehicle interior light system comprises one or more light sources employed as illuminators or projectors, one or more detectors configured to detect motions of objects or occupants (passengers or operators) of the vehicle, and a computing module that comprises a processor configured to receive and process signals form the one or more detectors and a controller configured to receive signals from the processor and in response control the one or more light sources.

As summarized above, the vehicle illumination system can provide spot illumination that follows a moving object, a moving occupant, or a portion of a moving occupant in the vehicle.

Also as shown in FIG. 1, the system may further comprise a transceiver allowing it to communicate with another processor in the vehicle, or with a network, for example to receive instructions from an occupant of the vehicle.

Appropriate color of lighting may be selected based on such parameters as, for example, the speed of the vehicle, the ambient lighting, consideration for the driver and vehicles in the vicinity, reduction in glare and preservation of night vision.

The lighting may be adjusted by the user from, for example, input vehicle controls or interface, mobile device user interface and communication systems, and vehicle to vehicle, vehicle to occupant, and vehicle to network communication systems. Inputs from a vehicle computer and sensors can also be inputs into the lighting system.

In some variations gesturing may be used to operate and adjust the lighting. In such cases, gestures may be detected using, for example, infrared (IR) illumination and detection, with infrared illumination from for example IR LEDs or VCSELs. Occupants may use gesturing to communicate with the light source, such as to turn on or off the source, adjust its direction, intensity, and color. Light sources may automatically follow the movement of a passenger with dynamic beam steering.

Figure 2:
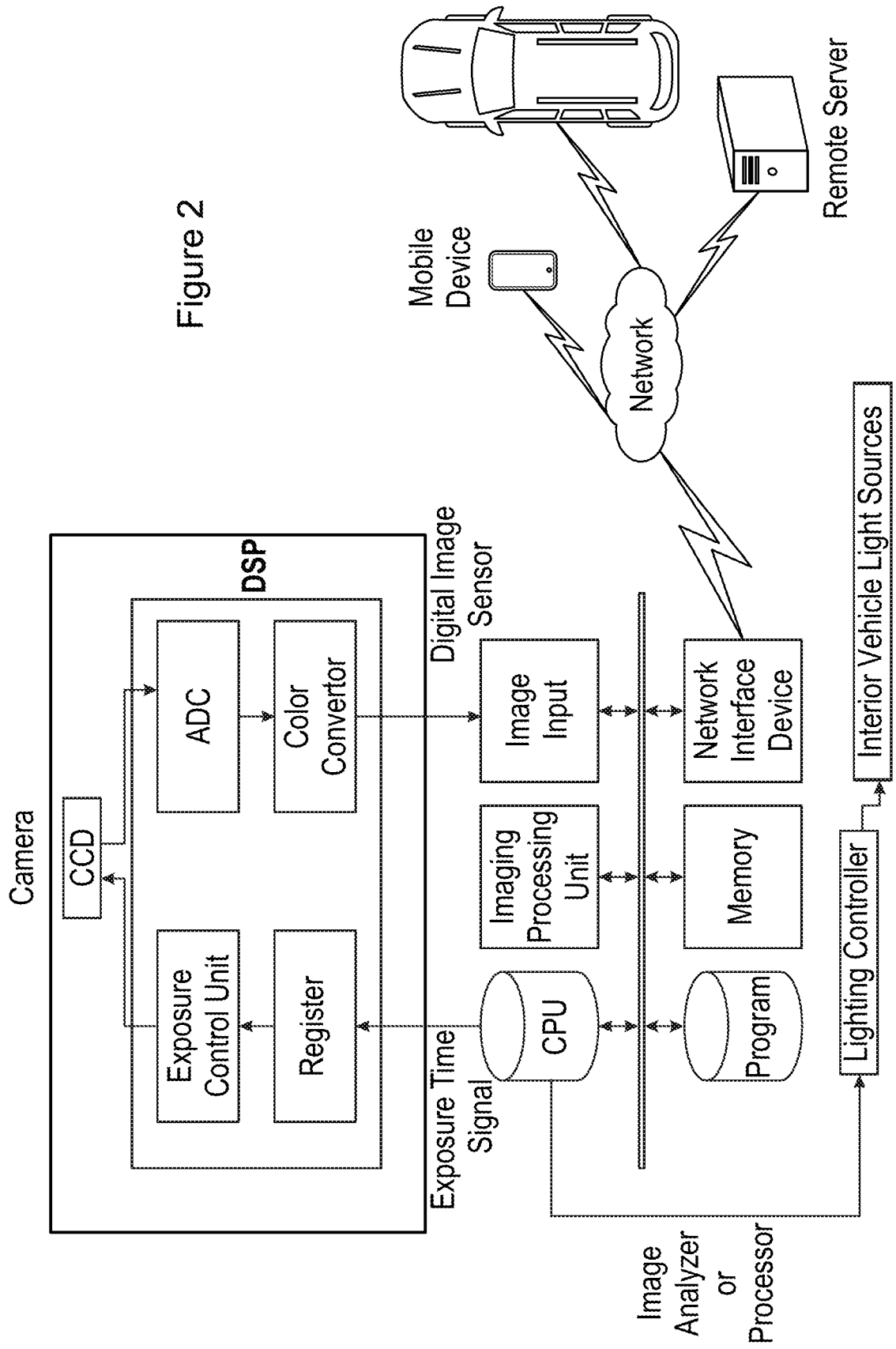
FIG. 2 is a more detailed block diagram of an example embodiment of a vehicle interior light system as disclosed herein.

As shown in FIG. 2, for example, these illumination systems can employ one or more detectors (e.g., sensor, or camera) that may function in the IR, ultrasonic, radar, and/or LiDAR range. Controllers and processors can take the detector, sensor, and/or camera output signals as input to output lighting control to the light source(s) and, for example, control the lighting of pixel elements in a matrix array by controlling which CMOS transistors are turned on and off, or controlling the laser beam rastering of color converting elements or pixels via a MEMS based mirror array or an acousto-optic reflector or deflector, for example, or controlling the light source segments of a waveguide that control the radiation pattern or distribution emitted by the waveguide.

Light color may be adjusted based on ambient light for example if it is dark, red light may be chosen so as to not disturb the night vision of the vehicle driver or driver of other vehicles in proximity.

Internal vehicle lighting should have a vertical illuminance (in a vertical plane) to illuminate an occupant with minimal glare to the occupant and external or internal observer. Vehicle lighting should also have a horizontal illuminance to illuminate a surface such as a seating or floor area with minimal glare to the observer. When measured on a vertical plane, the lighting should be higher than the horizontal illuminance for occupant illumination. When measured on a horizontal plane, the lighting should be higher than the vertical illuminance for horizontal area illumination. It should also minimize glare from reaching the driver or occupant. One solution is to use luminaires with asymmetric light output.

Illuminance (E) is the amount of light that falls on an area of a surface and can be measured in units of lux (lx) and is the same as lumens/m² (lm/m²). The illuminance on a plane normal to the direction of propagation of light, such as a horizontal surface of a vehicle, is equal to the luminous intensity (I) divided by the square of the distance (D). The distance D is the mounting height (h) of the light source divided by the cosine of the angle between a vertical line at the measurement point on the street surface to the line connecting the point to the light source:

$E = I/D^2 = I/(h/\cos \gamma)^2 = I \cos^2 \gamma / h^2$ and for the point directly beneath the light source ($\gamma = 0°$), then $E = I/h^2$.

The illuminance on a horizontal surface of the vehicle interior is the illuminance E multiplied by the cosine of the angle between the direction of propagation of light to the street and the street is the horizontal illuminance Ehoriz and is the illuminance on the horizontal surface:

$Ehoriz = I \cos \gamma / D^2 = (I \cos \gamma)/(h/\cos \gamma)^2 = I \cos^3 \gamma / h^2$.

For a seated occupant in the vehicle, the illuminance on the occupant is the illuminance E multiplied by the cosine of the angle between the direction of propagation of light to the occupant and plane normal. This is the vertical illuminance Evert and is the illuminance on a vertical surface, such as an occupant. If the height of the occupant is hp, then the vertical illuminance on the pedestrian is:

$Evert = I \sin \gamma / D^2 = (I \sin \gamma)/((h-hp)/\cos \gamma)^2 = I \sin \gamma \cos^2 \gamma /(h-hp)^2$.

Luminance (L) is the light emitted, transmitted, or reflected from a surface in a specific direction per unit area and can be measured in Cd/m² or nit. A candela is the same as a lumen/steradian (lm/sr). In the case of the occupant, an observer in the vehicle would perceive the luminance of the (vertical) illuminance reflected off the occupant. This is related to how bright the occupant appears when viewed from a specific direction, however the appearance of the surroundings and the observer's eye adaptation level with the object luminance also come into play. In the case of a projection on a horizontal surface, an observer in a vehicle would perceive the luminance of the (horizontal) illuminance reflected off the surface. Luminance and contrast are both used in calculating the appearance of a surface or an object on the surface.

Light on a surface is either reflected, absorbed, and/or transmitted. For the surface projection and occupant illumination, we are mainly concerned with reflected light. There are various types of reflected light such as specular and diffuse. Specular such as a reflection from a mirror or mirror like surface is reflected at an opposite angle of incidence and with an intensity nearly equal to the incident ray. For a diffuse reflecting surface, light is scattered and reflected in all directions. An image projected onto a vehicle surface or projected onto an occupant may have a mostly diffuse reflection. Illumination of clothing, seat coverings, and carpeting for example results in a mostly a diffuse reflector. The luminance of a perfectly diffuse reflector is:

$L = RE/\pi$, where R is the reflectance, E is the illuminance, and $\pi$ is pi steradians.

Contrast is the visual difference between an object and its background and is often expressed as:

$C = (L_p - L_{background})/L_{background}$.

Contrast can be positive or negative and can range from very large positive numbers when the background luminance is very low to something close to −1 when the object luminance is very low. However, for a lighted object (brighter than ambient or background) contrast C will be positive and for a shadow or dark more absorbing object (object dimmer than ambient or background) contrast C will be negative.

For the lit horizontal object, $C = ((R_p Ehoriz/\pi) - L_{background})/L_{background}$.

The only variable that can be controlled is the horizontal illuminance from the light source on the object. The background luminance is determined by the surroundings and can be very low at night or brighter with ambient light. The reflectivity of the object Rp is largely determined by the object material and finish. Bright background luminance and reduce contrast make it more difficult to discern a positive contrast object. To compensate for a higher background luminance Lbackground, horizontal illuminance Ehoriz must be increased for an observer to clearly see an object.

Similarly, for the lit vertical object or occupant, $C = ((Rp Evert/\pi) - L_{background})/L_{background}$, and the previous discussion applies. The only variable that can be controlled is the vertical illuminance from the light source on the occupant or object. The background luminance is determined by the surroundings and can be very low at night or brighter with ambient light. The reflectivity of the object Rp is largely determined by the occupant or object. Bright background luminance and reduce contrast make it more difficult to discern a positive contrast object. To compensate for a higher background luminance $L_{background}$, vertical illuminance Evert must be increased for an observer to clearly see the occupant or object.

Depending on background luminance a horizontal illuminance Ehoriz or vertical illuminance Evert of at least 0.01, 0.1, 1, 5, 10, 20, or 30 lx is needed to provide adequate projection visibility. Glare is another consideration in designing a projection illumination system. Glare can be from a light source that is not properly aimed and could affect the occupant, observer, or driver. Glare happens when luminance is much higher than the luminance to which the eyes are adapted to. Discomfort glare occurs when the observer experiences discomfort or pain when viewing the light source, but disability glare limits or prevents the observer from performing a visual task, such as discerning a projection or the associated dangers. Projection lighting systems will need to mitigate disability glare. An object being illuminated has a threshold contrast $C_{Threshold}$ at which the projection may just be detected that is a probability of detection of 50% and depends on such things as visual angle α of the object that is related to object size, length of observation time $t_{observe}$, the adaption luminance $L_{adaption}$ of the observer, and the age of the observer. For projection safety, lighting conditions must provide an actual contrast CActual that is greater than threshold contrast $C_{Threshold}$. The visibility level VL is defined as the ratio of the actual contrast to the threshold contrast:

$$VL = C_{Actual}/C_{Threshold} = C_{Actual}/C_{Threshold}(\alpha, t_{observe}, L_{adaption}, age)$$

The higher the VL, the greater the chances that the projection is seen. VL provides a measure of the performance of a projection system. Visibility level VL for concrete and asphalt as a function of reflectivity R.

The internal vehicle illumination system can provide a spot light illuminating a passenger and providing ample illuminance in the vertical plane Evert for each passenger in the vehicle. The spot light can emanate from a single light source such as an array or, multiple light sources spatially separated can be used. The spot illumination need not be circular in shape and may be any shape that illuminates the passengers and can follow the passengers in real time. This spot illumination can be provided by light rays traveling in a direction horizontal to the floorplan and normal to the vertical plane of the passenger and increase the vertical illuminance Evert. Some extra spot illumination may be provided to the seat or floor area Ehoriz surrounding the passengers, The horizontal illuminance following the passengers in real time can be any shape including for instance a rectangular section that follows the passenger's movement. This Ehoriz illuminance can be in the form of a projection, where the area surrounding the passenger can be highlighted with a projection on or above the floorpan, for example a partial or full circular-oval or square-rectangular type shape in white or red for example. The horizontal illumination that is not part of the projection can be suppressed in an area around the passenger and the projection to maximize contrast, this suppressed or dark spot of horizontal illumination Ehoriz can also follow the passenger. Alternatively, a mobile phone or display device in the vehicle can be used to adjust the interior lighting.

Referring again to FIG. 1 and to FIG. 2, an infrared (IR) light source, for example a VCSEL or LED array can be used with a camera to detect objects and occupants in the vehicle. The IR light sources may be mounted in or integrated with the visible light sources or may be mounted separately. The camera may comprise a CCD and digital signal processor (DSP) that communicate with each other as shown in FIG. 2. The DSP may also communicate with the processor or an image analysis unit that can have an image input to which the DSP connects, an imaging processing unit, a CPU that can send an exposure signal back to the camera DSP, program, and memory. The camera DSP may further comprise an analog digital converter (ADC) that receives a CCD input, a color converter unit that outputs a digital image signal to the image input of the imaging processing unit, an exposure control unit that outputs a signal to the CCD, a register that receives an exposure signal from the CPU of the image processing unit and outputs signals to the exposure control unit and the color converter unit. The CPU of the image analysis unit or processor can output a signal to a controller of the light sources.

Based on the processor output, the controller can turn on and off various light sources and control the beam the beam pattern from each of the individual light sources. Optionally the CPU of the image analysis unit or processor can also output a signal to a control unit of the IR light source, or the controller can operate and control all the light sources including the visible and IR. This illustrates one embodiment and instead of or in addition to a camera and IR source, ultrasonic, LiDAR, radar, heat sensors that may detect IR, or pressure sensitive pads that can be installed below ground with appropriate sensors or detectors may be used along with optional supplemental sources used to generate the radiation or signal of the source to be detected.

The computing module can take the detector and transceiver inputs to generate appropriate illumination and/or projection location, intensity, and colors based on these inputs. The computer module can also send information via the transceiver to mobile devices, vehicles, and remote servers through the network or Ethernet.

The controller and processor can be integrated together in the same unit or module (e.g., the computing module shown in FIG. 1). Likewise, visible and IR light source can be integrated together in the same fixture or any optional supplemental radiation source such as ultrasonic, radar, VCSEL, LED array, or LiDAR can be integrated together in a fixture. It is also possible to integrate all electronics together in the light source, so that detector radiation, detector, processor, controller as well as visible light emitting elements are together in a module or fixture that may be termed as a smart light or smart lighting source.

Embodiments of this invention include using LED and laser light sources and arrays that can be positioned on the vehicles for interior projection and illumination. The projections and illumination can be used for occupant and vehicle illumination such as seating and floor area as well as door handles, latches, control knobs, clocks, gauges and the like. Projection and illumination sources can be located in the interior roof, along the sides of the roof, above or in or along the top of the side windows, rear window, or windshield, along the interior sides, the interior rear, the front including dashboard and firewall, front and rear seats, door sills, and floor. Lighting can outline or accent all interior areas or components and or illuminate these areas or occupants.

Illumination and/or projection devices (light sources) used in the systems, devices, and methods described herein may be or comprise an LED array or laser system. An LED and laser device is discussed in U.S. patent application Ser. No. 15/802,273, which is hereby incorporated herein by reference in its entirety. A pixelated LED array, including a microLED array and laser pumped array are described in this reference. Such LED arrays are also described further, below, with reference to FIG. 3A-7.

The light sources may be or comprise a non-pixelated waveguide that may be edge-lit, embedded, or center-lit or a combination thereof.

Vehicle interior lighting includes, illumination such as a dome light, a reading or map lamps and occupant illumination that can be white, cool white (CW), warm white (WW), decorative, environmental, or mood lighting such as star projection on the headliner area, white and direct color and combinations, accent lighting—interior door panels, center console, dashboard highlights—for example knobs and switch clusters in white, CW, WW, direct color and combinations.

Control for the vehicle interior lighting system may have vehicle computer input, such as speed and direction— forward or reverse, ambient light, ambient temperature, user input via interface—i.e. direct touch to lamp, touch screen, slider and/or rotational knob input, switches, etc.

Embodiments of the vehicle interior lighting include waveguide—non-pixelated and microLED array—pixelated light sources. Waveguide non-pixelated embodiments include occupant illumination beam pattern by quadrant intensity, light absorbing cover, low glare to occupant and driver, and modular circular and semicircular shapes.

Spatial luminance distribution includes shape, appearance, glare characteristics. Light angular distribution includes Lambertian (low glare), batwing up/down (low glare), symmetric, asymmetric (rotational and up/down), backlight with angular distributions achieved by dot pattern that may be limited by the ink properties with a tradeoff between wider distribution and efficiency. Lambertian ink, Gaussian ink, translucent ink, white ink may be used. Waveguide in-coupling includes: direct-lit or embedded, edge-lite, center-lit, and combinations thereof.

Waveguide materials includes: Glass, polycarbonate (PC, i.e., Lexan™), poly methyl methacrylate (PMMA, i.e., Plexiglas™, Acrylite™, Lucite™). Relative temperature index (RTI) in Celsius is the maximum service temperature for a material and transmittance generally decreases with increasing RTI. RTI95, RTI90 and RTI50 for example are of interest.

Surface treatment of the waveguide to incorporate light extraction features include, embossed, translucent, 2-sided translucent, white, 2-sided white, laser extraction features are of interest. Dual-sided dot pattern (DSDP) can extract more light out of the LGP but at the expense of uniformity compared to single-side dot pattern (SSDP). Back reflector of the waveguide light source may include a specular reflector, diffuse reflector, combination of specular and diffuse, or no reflector. The light emitting side of the waveguide may include a top film of a diffuser and de-glare, diffuser, de-glare, or none. The waveguide or light guide plate (LGP) profile or cross section can be concave, wedge, or flat. Wedging or grooving the LGP can be used to improve uniformity and reduce house lighting in Type III (60-70 degrees) street lighting application. LGP shape car be circular, octagonal, polygonal, rectangular, or square. Beam steering (pattern distribution) may be accomplished by segmented (sector) illumination (intensity) with dynamically controllable light distribution.

The waveguide light sources made be embedded, center lit, edge lit or a combination of these.

The light distribution can be dynamically controllable with reduced glare, high contrast, and may have a light absorbing or black cover. The light source may have a circular shape and may be modular. For example, a circular shaped unit may be located between a front and rear seat and used to illuminate the 2 or 3 front row passengers and the 2 or 3 rear seat passengers. A semicircular unit that is modular to the circular unit can be used to illuminate a third row seat that also holds 2 or 3 rear most passengers. Seating rows may face each other and passengers sitting face to face may be illuminated by the same light source.

MicroLED pixelated embodiments include color adjustable WW, CW, and low glare. Single or multiple quadrants of microLED arrays can have a light absorbing cover, be low glare to occupant and driver, and modular circular and semicircular shapes, for example, a circular shaped unit may be between a front and rear seat and used to illuminate the 2 or 3 front row passengers and the 2 or 3 rear seat passengers. A semicircular unit that is modular to the circular unit can be used to illuminate a third row seat that also holds 2 or 3 rear most passengers.

Switching on array pixels can provide beam steering to one or multiple occupants and occupants can be in reverse and forward facing rows so that passengers are face to face with one another. A light absorbing (black) cover for low glare and high contrast may also be used.

The lighting system includes one or more light sources that can provide a horizontal and vertical illuminance. In various embodiments the vertical illuminance can be less than the horizontal illuminance, the vertical illuminance can be equal the horizontal illuminance, and the vertical illuminance can be greater than the horizontal illuminance. In general, it is desirable that the vertical illuminance be greater than the horizontal illuminance, so that the passenger is in positive contrast and background luminance is minimized.

However, an optional projection can work in conjunction with the spot lighting to provide a line or boundary, partial or full around a passenger. These projections can be projected on the floor and can have a local horizontal illuminance that is much higher than the surrounding horizontal illuminance. In these embodiments with projections, the horizontal illuminance of the projection can be higher than the surrounding local horizontal illuminance and approach the vertical illuminance of the passenger, be equal to the vertical illuminance of the passenger, or be greater than the vertical illuminance of the passenger. Preferably, the spatial zone of the projection does not significantly overlap with the spatial zone of the vertical illuminance of the passenger.

In one embodiment, the vertical illuminance is one-half or more the horizontal illuminance. In another embodiment, the vertical illuminance is at least equal to the horizontal illuminance. In yet another embodiment, the vertical illuminance is at least twice the horizontal illuminance. Another embodiment, the vertical illuminance is at least five times the horizontal illuminance. In an embodiment, the horizontal illuminance of the projection is at least twice the horizontal illuminance of the surroundings. In another embodiment, the horizontal illuminance of the projection is at least five times the horizontal illuminance of the surroundings. In an embodiment, the horizontal illuminance of the projection can be about equal to the vertical illuminance of the pedestrian. In another embodiment, the horizontal illuminance of the projection can be greater than the vertical illuminance of the passenger. In an embodiment, the vertical illumination of the passenger has minimal overlap with the horizontal illuminance of the projection in the observer's view. In an embodiment, the luminance of a passenger is at least twice luminance of the background or local background (outside of a projection). In another embodiment, the luminance of a passenger is at least five times the luminance of the background. In yet another embodiment, the luminance of a passenger is at least ten times the luminance of the background. In one embodiment, the vertical illuminance of a passenger is at least 0.1 lx. In one embodiment, the vertical illuminance of a passenger is at least 1 lx. In one embodiment, the vertical illuminance of a passenger is at least 2 lx. In one embodiment, the vertical illuminance of a passenger is at least 5 lx. In one embodiment, the vertical illuminance of a passenger is at least 10 lx. In another embodiment, the vertical illuminance of a passenger is at least 20 lx. In yet another embodiment, the vertical illuminance of a pedestrian is at least 30 lx. In still another embodiment, the vertical illuminance of a passenger is at least 50 lx. In still yet another embodiment, the vertical illuminance of a passenger is at least 100 lx.

As noted above, the system may provide spot lighting or illumination of the passenger, where the vertical illumination of an object or passenger can be greater than the vertical illumination outside the spatial zone of this spot illumination. In an embodiment, the spot vertical illumination is at least 1.5 times the vertical illumination outside the spot. In another embodiment, the spot vertical illumination is at least twice the vertical illumination outside the spot. In yet another embodiment, the spot vertical illumination is at least five times the vertical illumination outside the spot. The horizontal illumination can also be dimmed or turned off around the passenger and this dark hole follows the passenger, so that the vertical illumination of the spot lighting and horizontal illumination of the optional projection.

The power consumption for the interior lighting system of this invention can be lower than conventional systems. For example, the spot lighting of individual occupants or objects in the vehicle can supply excellent vertical illuminance on the occupant or object, without having to supply this level and uniformity of vertical illumination over a large area of the vehicle interior. For conventional lighting systems, the power consumption does depend on the area of illumination. Lighting system of this invention can be turned off when not needed or can be dimly lit with a horizontal illuminance. When needed, the horizontal illumination can increase, so that the occupant or object is sufficiently illuminated and increased vertical illumination is provided to make the occupant or object readily visible. For computer modeling a seated passenger may be represented as 3 feet tall with an eye height of 2 feet 7 inches and a reflectance of 18%. The use of these lighting systems using LED arrays and/or laser light source, detector, optional emission for the detector, processor and controller may provide for greatly improved passenger lighting and may save on power consumption.

As noted above, the illumination and/or projection devices used in the systems, devices, and methods described herein may be or include an LED array or laser. Some aspects of such LED arrays are further described next, with reference to FIG. 3A-FIG. 7.

Figure 3A:
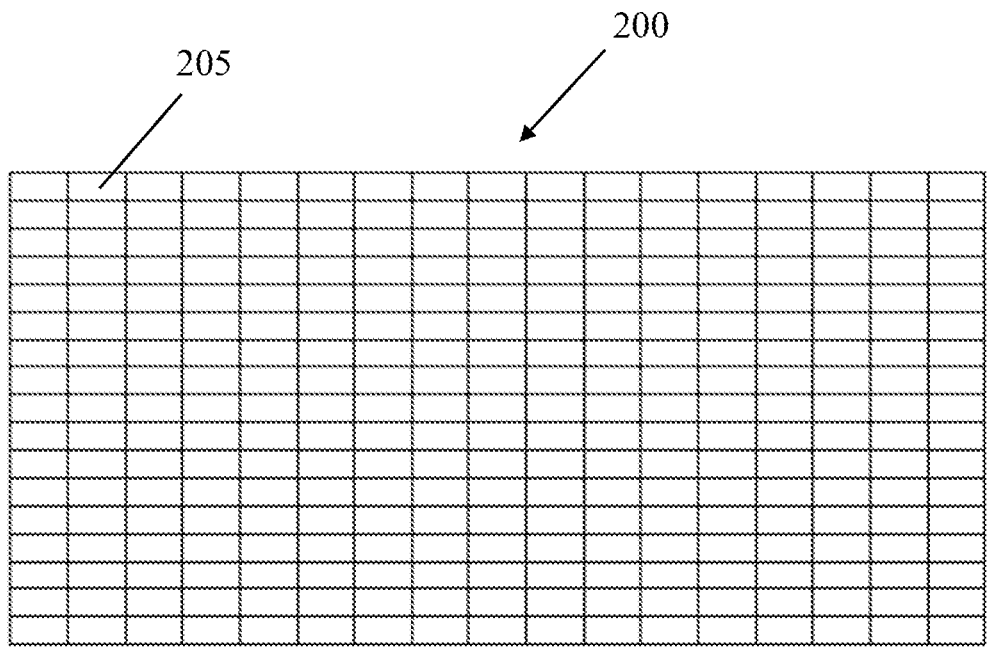
FIG. 3A and FIG. 3B, respectively, show plan and schematic views of an example M×N matrix pixelated microLED that may be used in light sources in an interior vehicle lighting system as described herein.
Figure 3B:
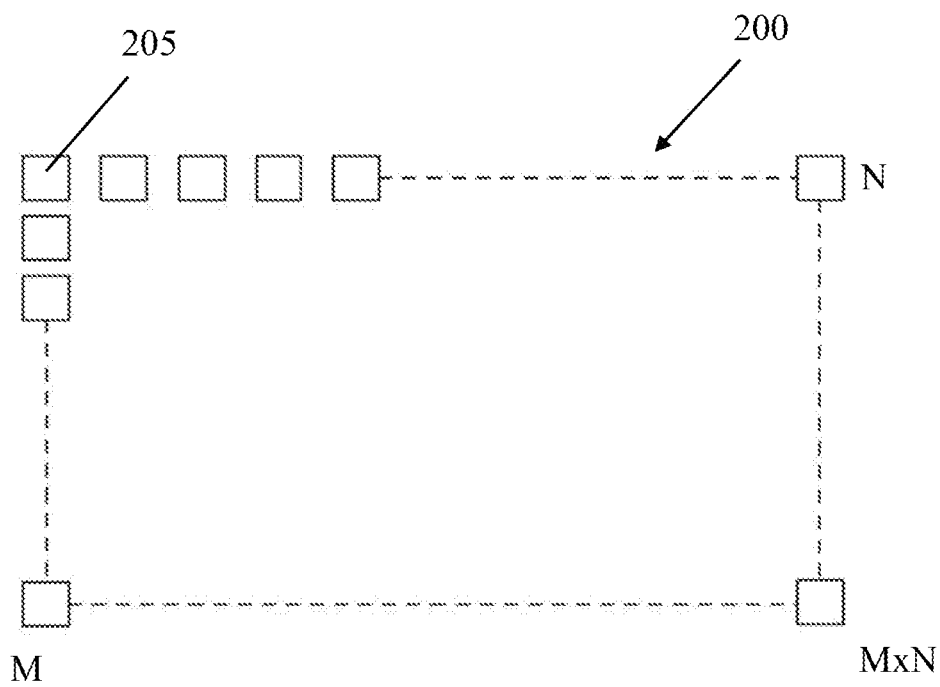

FIGS. 3A and 3B show plan and schematic views of an example M×N matrix pixelated microLED 200, comprising M×N pixels 205. The number of individual pixels in the array can be, for example, 2 to 10 and can be used in a mobile phone flash and the like, 10 to 50 in some embodiments, 50 to 100 in some embodiments, 100 to 500 in other embodiments, 500 to 1000 in other embodiments, 1000 to 2500 in yet other embodiments, 2500 to 5000 in yet other embodiments, 5000 to 10000 in still yet other embodiments, these can be used for instance in adaptive vehicle headlights, adaptive street lights, adaptive crosswalk illumination and the like. Still other embodiments include 10000 to 100000 and 100000 to 500000 that can use LED or laser light sources, 500000 to 1000000, and 1000000 to 100000000 that can use laser light source or sources such as a raster scanned laser(s) may be used. Raster scanning may be accomplished with a microelectromechanical system (MEMS) based mirror or with an acousto-optic reflector or deflector. These embodiments can be suitable for displays.

Figure 4A:
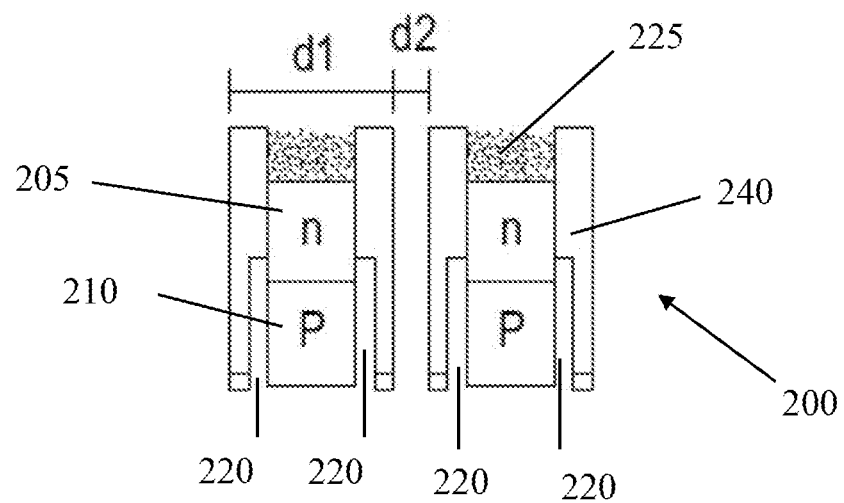
FIG. 4A shows a schematic partial cross-sectional view of a portion of an example M×N matrix pixelated microLED that may be used in light sources in an interior vehicle lighting system as described herein.

FIG. 4A shows a partial cross sectional view of one embodiment of an LED matrix array 200. The n (205) and p-type (210) semiconductor layers sandwich an active region that emits light. The n and p-type semiconductor layers and the active region may themselves contain multiple layers of different doping levels and compositions. For example the active region may be a single light emitting layer, a homojunction, a single heterojunction, a double heterojunction or heterostructure, a single quantum well heterostructure (SQW), a multiple quantum well (MQW) structure, or a superlattice (SL) structure. The n and p-type semiconductor layers may be for example GaN or AlGaN and the active region may be InGaN and GaN. Other semiconductor material systems include AlGaInP, AlGaAs, and AlGaInAsP for example. Once the epitaxial layers are grown, trenches can be etched through the p-layers and into the thicker n-layer.

The p-n junction can be passivated with a dielectric, such as SiOx, AlOx, SiON, SiAlON, TaOx, AlOx, or Si3N4 or the like to prevent shorting or may be isolated by ion implantation, such as hydrogen, carbon, and oxygen ions for example. In the example of FIG. 4A, such dielectric may be deposited on surfaces of the n and p layers in regions 220. Metal contacting the n-layer and the dielectric can extend to the p-layer side. P-metal may be deposited before or after the trench etch.

In one embodiment, metal contacts 240 to n-type material can extend to the p-side surface with isolation from the p-type material. The p-type and n-type metal electrodes may then be on the same side and can be bonded to a silicon wafer that may contain electronics such as a switching transistor, TVS, open and/or short detection and the like. Bonding can include soldering, such as AuSn or SnAgCu (SAC) solders, or a GGI bond using thermal and ultrasonic energy to form an Au bond interconnect.

The metal may be extended by plating for example past the n-layer after the growth substrate, for example sapphire, is removed. The n-metal can serve as the seed for plating and may be exposed by growth substrate removal, if the p-side trench and metallization extends completely through the n-layer to the substrate, by thinning the p-layer, or a subsequent trench etch from the n-side after substrate removal. The p and n-metal contacts are preferably reflective and may be for example Ag, Al, Ni, Ti, TiW, TiWN, Au, Zn and combinations and layers thereof. The extensions beyond the n-surface can be a reflective metal as described above or a TCO, such as ITO, ISO, AZO, IZO or a dielectric, such as sapphire, photoresist, SiOx, SiON, SiAlON, TaOx, AlOx, or Si3N4 that may be reflective by TIR or a metallic coating.

Figure 4B:
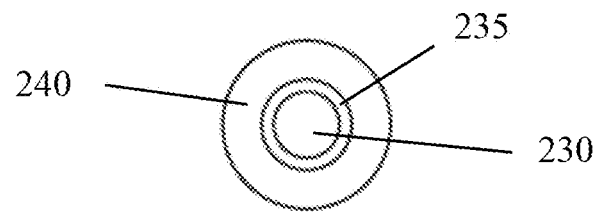
FIGS. 4B and 4C show schematic plan views of example arrangements of n and p electrodes in the example microLED.
Figure 4C:
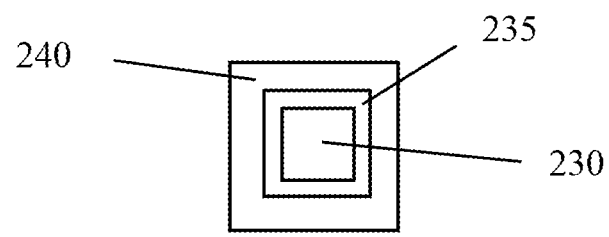
Figure 5A:
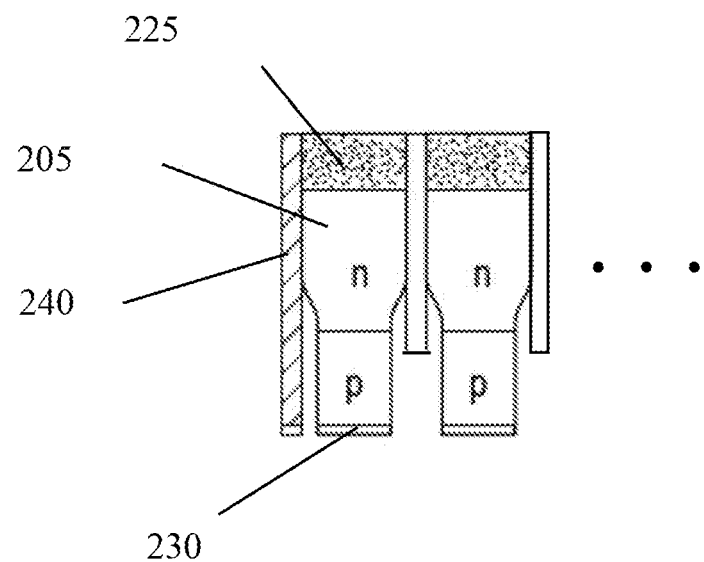
FIG. 5A and FIG. 5B each show schematic partial cross-sectional views of portions of other example M×N matrix pixelated microLED that may be used in light sources in an interior vehicle lighting system as described herein.
Figure 5B:
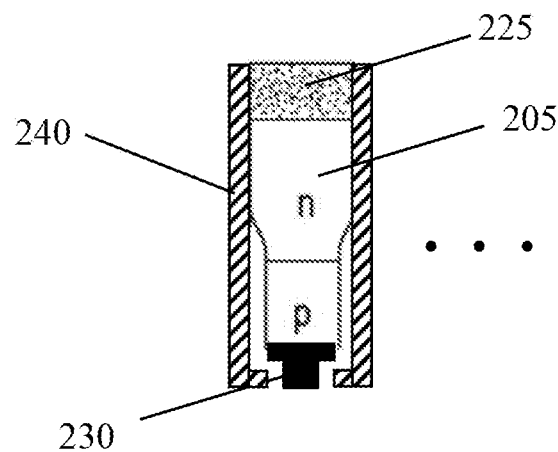
Figure 6:
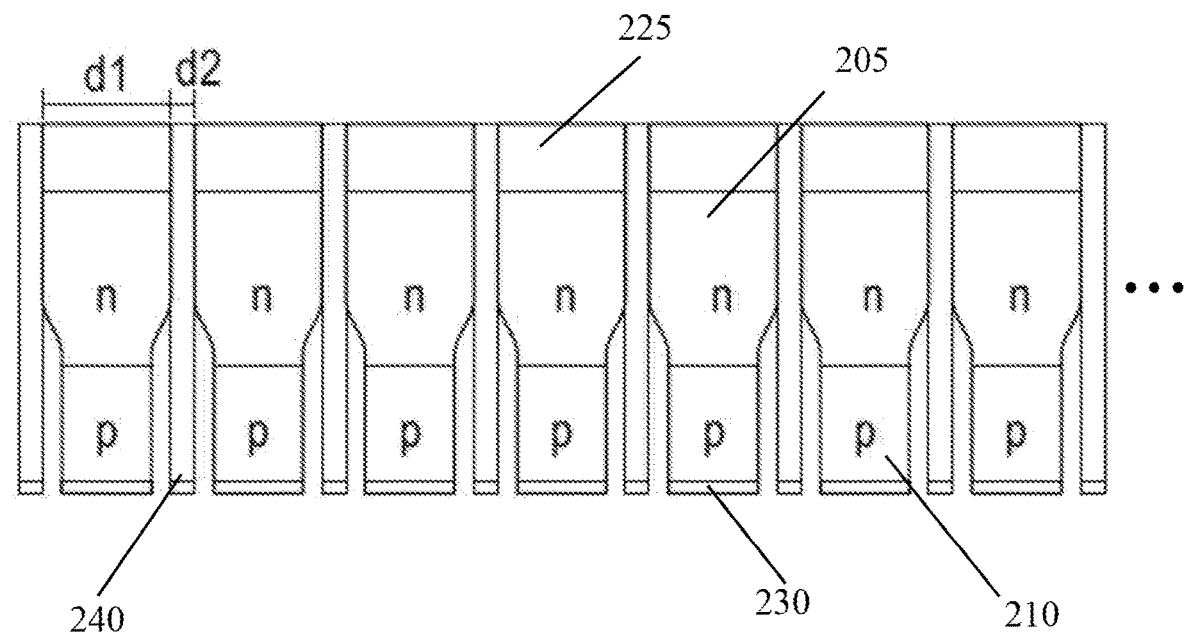
FIG. 6 shows a schematic partial cross-sectional view of a portion of another example M×N matrix pixelated microLED that may be used in light sources in an interior vehicle lighting system as described herein.
Figure 7:
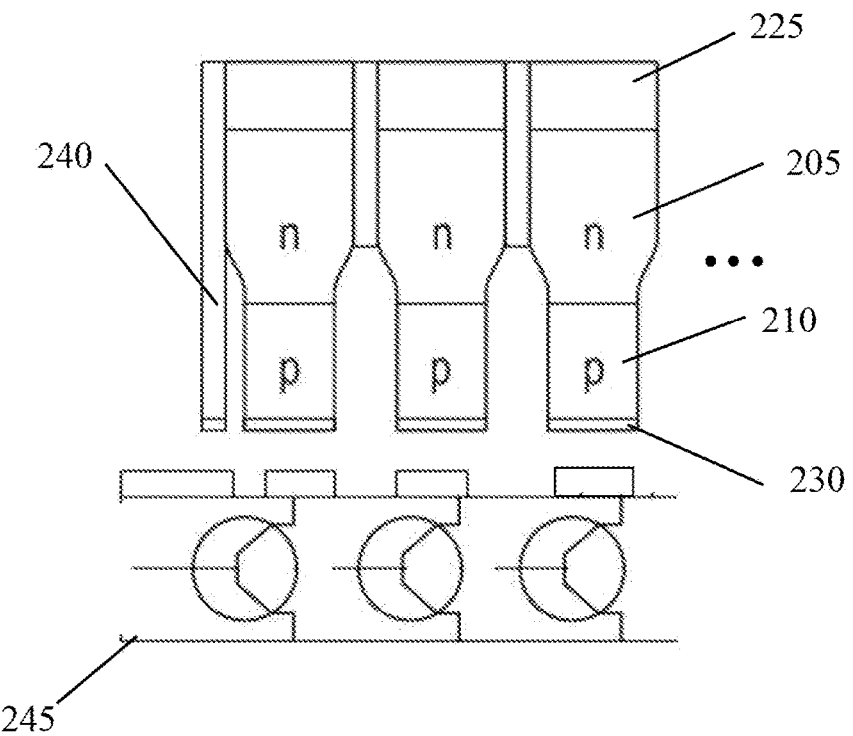
FIG. 7 shows a schematic partial cross-sectional view of a portion of another example M×N matrix pixelated microLED that may be used in light sources in an interior vehicle lighting system as described herein, in combination with a schematic partial cross-sectional view of a portion of a CMOS silicon back plane that may be used to switch pixels in the array on and off.

The extensions may be used to hold or contain a wavelength converter 225, such as phosphor in silicone or other suitable binder or a ceramic phosphor. Phosphor may be applied by dispensing, ink-like jet printing, sedimentation, EPD, stenciling, spraying or molding. The pixel may be for example square, round, oval, or rectangular in shape. FIG. 4B and FIG. 4C show that the p-electrode 230 can be square, rectangular, circular, or oval in shape surrounded by a thin dielectric 235 and the n-electrode 240 around the perimeter. The n-electrode may completely surround (FIG. 4A and FIG. 6), partially surround (FIG. 5A), or be to one side of the p-electrode (FIG. 7). The n-electrode may also overlap the p-electrode separated by a dielectric (FIG. 5B).

The electrodes may be connected in the device or by the Si backplane 245 (schematically shown for example in FIG. 7) in a common cathode or anode configuration. The n and p-layer and electrode positions are shown in the figures for convenience, but their positions can also be swapped that is opposite from what is shown.

Multiple matrix arrays may be used in an illumination device and these multiple arrays may be spaced apart from one another and do not have to be adjacent in an extended matrix configuration. For instance, one matrix in a crosswalk illumination system may provide for crosswalk illumination and another matrix is used to provide spot lighting that follows the pedestrians as they cross the street.

Pixel size d1 (FIG. 4A and FIG. 6) may be for example from submicron to 1 micron, 1 micron to 10 microns, 10 microns to 50 microns, and 50 microns to 500 microns in various embodiments. Pixel spacing d2 may be determined by width of the metal layer (FIG. 6) or may include an actual gap (FIG. 4A). Pixel spacing d2 may be for example less than 0.1 micron, 0.1 to 1 micron, 1 micron to 5 microns, and 5 to 50 microns embodiments. Pixel spacing d2 may depend on pixel size d1.

Pixels may be in any shape or combination of shapes, for example circular, square, rectangular, triangular, hexagonal and combinations thereof. Phosphor particle sizes may depend on pixel size d1 and may be at least d1/10 or smaller in size. The luminous flux of these arrays can be $10^{-4}$ to $10^{-3}$ lumens (lm), $10^{-3}$ to 0.1 lm, 0.1 to 10 lm, 10 to 1000 lm, 1000 to 10000 lm, 10000 to 100000 lm, and 0.1 to $5 \times 10^6$ lm in some embodiments. The luminance of these arrays can be 10 to 100 lux (lx), 100 to 500 lx, 500 to 1000 lx, 1000 to 50000 lx, 50000 to 500000 lx, $0.5 \times 10^6$ to $1 \times 10^6$ lx, $1 \times 10^6$ to $10 \times 10^6$ lx, and $10 \times 10^6$ to $5000 \times 10^6$ lx in some embodiments. The illuminance of these arrays may be 10 to 100 nit, 100 to 1000 nit, 1000 to 10000 nit, 10000 to 100000 nit, $0.1 \times 10^6$ to $1 \times 10^6$ nit, $1 \times 10^6$ to $1000 \times 10^6$ nit in some embodiments. The luminance and illuminance of these arrays can be measured without external optics and can include laser as well as LED arrays. Luminous efficacy can be 1 to 20 lm/W, 20 to 200 lm/W, and 200 to 500 lm/W in some embodiments. These arrays may be packaged with primary optics, such as lenslet arrays or compound parabolic concentrators (CPC) and may include secondary optics such as a projection lens.

This disclosure is illustrative and not limiting. Further modifications will be apparent to one skilled in the art in light of this disclosure and are intended to fall within the scope of the appended claims.

The following enumerated paragraphs (clauses) provide additional non-limiting examples of the disclosure.

1. A vehicle interior lighting system comprising: a light source; a detector; a processor; and a controller; wherein the system is configured so that light from the light source illuminates a vehicle interior and provides spot illumination to moving objects in the vehicle, such that the spot illumination follows the moving object.

2. The lighting system of clause 1, wherein the lighting system is stationary within the vehicle.

3. The lighting system of clause 1, wherein the light source comprises one of a LED and laser.

4. The lighting system of clause 1, wherein the light source comprises a LED array.

5. The lighting system of clause 1, wherein the light source comprises a microLED array.

6. The lighting system of clause 1, wherein the light source comprises a laser and wavelength converter.

7. The lighting system of clause 1, wherein the system is further configured to provide a spot of reduced horizontal illuminance that follows the moving object for increased contrast.

8. The lighting system of clause 1, wherein the system further comprises a projection at least partially surrounding and following a passenger.

9. The lighting system of clause 8, wherein the projection is one of circular, oval, square, and rectangular.

10. The lighting system of clause 1, wherein the system further provides a projection that comprises one or more color.

11. The lighting system of clause 5, wherein the microLED array comprises LED chips, mounted and electrically connected to CMOS circuitry on a silicon wafer, wherein the LED chips are separated by a dielectric and metal that extends above a semiconductor surface of the LED chip and is filled with a wavelength converter.

12. The lighting system of clause 1, wherein the system comprises a vertical illuminance that is at least twice the horizontal illuminance.

13. The lighting system of clause 1, wherein the system comprises a vertical illuminance that is at least five times the horizontal illuminance.

14. The lighting system of clause 8, wherein the horizontal illuminance of the projection is at least twice the horizontal illuminance of the surrounding non-illuminated area.

15. The lighting system of clause 8, wherein the horizontal illuminance of the projection is at least equal to the vertical illuminance of the passenger.

16. The lighting system of clause 8, wherein the horizontal illuminance of the projection is less than the vertical illuminance of the passenger.

17. The lighting system of clause 1, wherein the system further comprises a transceiver capable of communication with a network.

18. The lighting system of clause 17, wherein the system further comprises a transceiver capable of communication with at least one of a vehicle, a mobile phone, and a remote server over the network.

19. A vehicle interior lighting system comprising: a light source comprising: one of a microLED array and a waveguide; a detector; a processor; and a controller; wherein the system is configured so that light from the light source illuminates a vehicle interior and provides illumination to a moving passenger in the vehicle, such that the illumination is capable of following the moving passenger.

20. The vehicle interior lighting system of claim 19, wherein the detector is an IR detector.

21. The vehicle interior lighting system of clause 19, further comprising an IR light source.

22. The vehicle interior lighting system of clause 21, wherein the IR detector is responsive to gesturing.

23. The vehicle interior lighting system of clause 22, wherein the lighting system responds to gesturing by one of changing state from one of on and off, intensity, color, and beam location.

24. The vehicle interior lighting system of clause 21, wherein the IR light source is one of a LED array or VCSEL.

25. The vehicle interior lighting system of clause 19, wherein the detector is capable of detecting the location of a driver and vehicle occupants, inputs this information to one of the processor and controller, the controller reducing the glare of the light source to at least one of the passenger being illuminated, the other occupants, and the driver.

26. The vehicle interior lighting system of clause 19, wherein the detector is capable of detecting an ambient lighting and adjust at least one of the color and intensity of the light source to preserve the night vision of at least one of the passenger being illuminated, the other occupants, and the driver.

27. The vehicle interior lighting system of clause 26, wherein the color is red.

28. The vehicle interior lighting system of clause 19, wherein the waveguide is center-lit.

29. The vehicle interior lighting system of clause 19, wherein the waveguide is a combination of center and edge-lit.

30. The vehicle interior lighting system of clause 28, wherein the waveguide center light source is segmented.

31. The vehicle interior lighting system of clause 28, wherein the segments of center light source can be individually operated and change the light output distribution of the waveguide.

32. The vehicle interior lighting system of clause 29, wherein the waveguide at least one of the center light source and edge light source is segmented.

33. The vehicle interior lighting system of clause 32, wherein the segments of at least one of the center light source and edge light source can be individually operated and change the light output distribution of the waveguide.

34. The vehicle interior lighting system of clause 19, wherein the waveguide is tapered.

35. The vehicle interior lighting system of clause 19, wherein the edge of the waveguide includes a reflector.

36. The vehicle interior lighting system of clause 19, wherein the waveguide is one of glass, PC, and PMMA.

37. The vehicle interior lighting system of clause 19, further comprising extraction features on the waveguide.

38. The vehicle interior lighting system of clause 37, wherein the extraction features are one of embossed, laser marked, and ink jetted.

What is claimed is:

1. A vehicle interior lighting system comprising:
a microLED array comprising a plurality of pixels, each pixel less than 500 microns in size, a spacing between pixels less than 50 microns, the plurality of pixels mounted and electrically connected to CMOS circuitry;
one or more detectors;
a processor configured to receive and process signals from the one or more detectors to detect motion of objects and occupants in the vehicle; and
a controller configured to receive signals from the processor and in response control one or more pixels of the microLED array to provide spot illumination to moving objects or occupants in the vehicle, such that the spot illumination follows the moving object or occupant.

2. The vehicle interior lighting system of claim 1, configured to provide a spot of reduced horizontal illuminance that follows the moving object or occupant for increased contrast.

3. The vehicle interior lighting system of claim 1, wherein the spot illumination comprises a vertical illuminance on the moving object or occupant and a horizontal illuminance on the moving object or occupant, and the vertical illuminance is at least twice the horizontal illuminance.

4. The vehicle interior lighting system of claim 3, wherein the vertical illuminance is at least five times the horizontal illuminance.

5. The vehicle interior lighting system of claim 1, wherein the microLED array provides a projection at least partially surrounding and following the object or occupant.

6. The vehicle interior lighting system of claim 5, wherein the projection is one of circular, oval, square, and rectangular.

7. The vehicle interior lighting system of claim 5, wherein the projection comprises one or more color.

8. The vehicle interior lighting system of claim 5, wherein the horizontal illuminance of the projection is at least twice the horizontal illuminance of the surrounding non-illuminated area.

9. The vehicle interior lighting system of claim 5, wherein the horizontal illuminance of the projection is at least equal to the vertical illuminance of the passenger.

10. The vehicle interior lighting system of claim 5, wherein the horizontal illuminance of the projection is less than the vertical illuminance of the passenger.

11. The vehicle interior lighting system of claim 1, wherein the pixels are separated by a dielectric and metal that extends above a semiconductor surface of the pixel and is filled with a wavelength converter.

12. The vehicle interior lighting system of claim 1, wherein the detector is capable of detecting an ambient lighting, and in response the controller adjust at least one of the color and intensity of the light source to preserve the night vision of at least one occupant being illuminated, other occupants, and a driver.

13. The vehicle interior lighting system of claim 12, wherein the color is red.

14. A vehicle interior lighting system comprising:
a light source comprising a microLED array comprising a plurality of pixels, each pixel less than 500 microns in size, a spacing between pixels less than 50 microns, the plurality of pixels mounted and electrically connected to CMOS circuitry, or a waveguide;
one or more detectors;
a processor configured to receive and process signals from the one or more detectors to detect motion of objects or occupants in the vehicle; and
a controller configured to receive signals from the processor and in response control the light source so that light from the light source illuminates the vehicle interior and provides illumination to a moving occupant in the vehicle, such that the illumination is capable of following the moving occupant.

15. The vehicle interior lighting system of claim 14, wherein the detector is an IR light detector.

16. The vehicle interior lighting system of claim 15, comprising an IR light source.

17. The vehicle interior lighting system of claim 16, wherein the IR light detector is responsive to gesturing.

18. The vehicle interior lighting system of claim 17, configured to respond to gesturing by at least one of: changing state from one of on and off, changing illumination intensity, changing illumination color, and changing light beam location.

19. The vehicle interior lighting system of claim 16, wherein the IR light source is one of an LED array or VCSEL.

20. The vehicle interior lighting system comprising:
a light source comprising a microLED, or a waveguide, or a microLED and a waveguide;
a detector capable of detecting the location of occupants in the vehicle;
a processor configured to receive and process signals from the detector to detect the location of occupants in the vehicle; and
a controller configured to receive signals from the processor and in response control the light source so that light from the light source illuminates the vehicle interior and reduces the glare of the light source to at least one occupant in the vehicle being illuminated.

* * * * *